United States Patent
Papamartzivanos et al.

(10) Patent No.: US 12,003,522 B2
(45) Date of Patent: Jun. 4, 2024

(54) METHOD AND SYSTEM FOR ADAPTIVE NETWORK INTRUSION DETECTION

(71) Applicants: NEC Laboratories Europe GmbH, Heidelberg (DE); UNIVERSIDAD DE MURCIA, Murcia (ES)

(72) Inventors: Dimitrios Papamartzivanos, Karlovasi (GR); Roberto Bifulco, Heidelberg (DE); Georgios Kambourakis, Karlovasi (GR); Felix Gomez Marmol, Murcia (ES)

(73) Assignee: NEC CORPORATION, Tokyo (JP)

( * ) Notice: Subject to any disclaimer, the term of this patent is extended or adjusted under 35 U.S.C. 154(b) by 434 days.

(21) Appl. No.: 17/291,617

(22) PCT Filed: Sep. 11, 2019

(86) PCT No.: PCT/EP2019/074274
§ 371 (c)(1),
(2) Date: May 6, 2021

(87) PCT Pub. No.: WO2020/094276
PCT Pub. Date: May 14, 2020

(65) Prior Publication Data
US 2022/0021695 A1    Jan. 20, 2022

Related U.S. Application Data (60) Provisional application No. 62/757,769, filed on Nov. 9, 2018.

(51) Int. Cl.
*H04L 9/00* (2022.01)
*G06F 8/60* (2018.01)
(Continued)

(52) U.S. Cl.
CPC ............ *H04L 63/1425* (2013.01); *G06F 8/60* (2013.01); *G06N 3/088* (2013.01)

(58) Field of Classification Search
CPC ........ G06N 3/088; G06F 8/60; H04L 63/1425
(Continued)

(56) References Cited

U.S. PATENT DOCUMENTS 9,306,966 B2 * 4/2016 Eskin .................. H04L 63/1425
9,497,204 B2   11/2016 Symons et al.
(Continued)

FOREIGN PATENT DOCUMENTS

| IN | 202231027007 A | * | 5/2022 | ............. G09B 19/00 |
| WO | 2018046412 A1 | | 3/2018 | |
| WO | 2018093926 A1 | | 5/2018 | |

OTHER PUBLICATIONS

R. Raina, A. Battle, H. Lee, B. Packer, A. Y. Ng, "Self-taught Learning: Transfer Learning from Unlabeled Data," in: Proceedings of the 24th International Conference on Machine Learning, ICML '07, ACM, New York, NY, USA, Jun. 2007, pp. 759-766.
(Continued)

*Primary Examiner* — Josnel Jeudy
(74) *Attorney, Agent, or Firm* — Leydig, Voit & Mayer, Ltd.

(57) ABSTRACT

A method adapts network intrusion detection. The method includes: a) deploying a network traffic capture system and collecting network packet traces; b) using a network audit tool, extracting features from the collected network packet traces; c) feeding the extracted features as unlabeled data into a representation function, and, utilizing the representation function as an unsupervised feature learning algorithm, learning a new representation of the unlabeled data; d) providing a labeled training set capturing examples of malicious network traffic, and, using the learned new rep-
(Continued)

resentation of the unlabeled data, modifying the labeled training set to obtain a new training set; and e) using the new training set, training a traffic classification machine learning model.

18 Claims, 5 Drawing Sheets

(51) Int. Cl.
  *G06N 3/088* (2023.01)
  *H04L 9/40* (2022.01)
(58) Field of Classification Search
  USPC .......................................................... 726/23
  See application file for complete search history.

(56) References Cited

U.S. PATENT DOCUMENTS

| | | | | |
|---|---|---|---|---|
| 10,193,902 | B1* | 1/2019 | Caspi | G06F 21/564 |
| 2005/0193430 | A1* | 9/2005 | Cohen | H04L 63/1433 |
| | | | | 726/25 |
| 2009/0326899 | A1* | 12/2009 | Ghorbani | H04L 63/1433 |
| | | | | 726/25 |
| 2018/0165554 | A1 | 6/2018 | Zhang et al. | |

OTHER PUBLICATIONS

J. O. Kephart, D. M. Chess, "The Vision of Autonomic Computing," Computer 36 (1), Jan. 2003, pp. 41-50, IEEE, USA.
W. Lee, S. J. Stolfo, "A Framework for Constructing Features and Models for Intrusion Detection Systems," ACM Trans. Inf. Syst. Secur. 3 (4), Nov. 2000, pp. 227-261, ACM, US.
M. Tavallaee, E. Bagheri, W. Lu, A. A. Ghorbani, "A Detailed Analysis of the KDD CUP 99 Data Set," in: Proceedings of the Second IEEE International Conference on Computational Intelligence for Security and Defense Applications, CISDA'09, IEEE Press, Piscataway, NJ, USA, Jul. 2009, pp. 53-58.
Kim, Kwangjo et al: "Deep Learning in Intrusion Detection Perspective: Overview and Further Challenges," 2017 International Workshop on Big Data and Information Security (IWBIS), IEEE, US, Sep. 23, 2017 (Sep. 23, 2017), pp. 5-10, XP033308856.
Min, Erxue et al: "SU-IDS: A Semi-supervised and Unsupervised Framework for Network Intrusion Detection," Sep. 13, 2018 (Sep. 13, 2018), International Conference on Financial Cryptography and Data Security; [Lecture Notes in Computer Science; Lect.Notes Computer], Springer, Berlin, Heidelberg, pp. 322-334, XP047485226.
Ahmad A. Al Sallab et al: "Self Learning Machines using Deep Networks," Soft Computing and Pattern Recognition (SOCPAR), 2011 International Conference of, IEEE, US, Oct. 14, 2011 (Oct. 14, 2011), pp. 21-26, XP032028187.
Phaisangittisagul, Ekachai and Rapeepol Chongprachawat, "Analysis Of Relation Between Unlabeled And Labeled Data To Self-Taught Learning Performance," World Academy of Science, Engineering, and Technology, Turkey, International Journal of Electrical and Computer Engineering, vol. 7, No. 4, Apr. 2013, pp. 429-433.
Karim, Ahmad M. et al. "A New Generalized Deep Learning Framework Combining Sparse Autoencoder And Taguchi Method For Novel Data Classification And Processing," Mathematical Problems in Engineering, vol. 2018, Article ID 3145947, pp. 1-13, Jun. 7, 2018, Hindawi, UK.
Pachghare, V.K. et al. "Performance Analysis Of Semi-Supervised Intrusion Detection System," International Journal of Computer Applications Special Issue on "Network Security and Cryptography" NSC, Dec. 15-19, 2011, pp. 15-19, Foundation of Computer Science, NY, US.
Zeng, Ming et al. "Semi-Supervised Convolutional Neural Networks For Human Activity Recognition," arXiv:1801.07827v1, Jan. 11, 2018, pp. 1-8, US.
Kozinski, Mateusz et al. "An Adversarial Regularisation For Semi-Supervised Training Of Structured Output Neural Networks," arXiv:1702.02382v1, Feb. 8, 2017, pp. 1-8, US.
Feng, Siwei and Marco F. Duarte, "Autoencoder Based Sample Selection For Self-Taught Learning," arXiv:1808.01574v2, Dec. 2, 2019, pp. 1-38, US.
Kemker, Ronald and Christopher Kanan, "Self-Taught Feature Learning For Hyperspectral Image Classification," IEEE Transactions on Geoscience and Remote Sensing, vol. 55, No. 5, May 2017, pp. 2693-2705, US.

* cited by examiner

METHOD AND SYSTEM FOR ADAPTIVE NETWORK INTRUSION DETECTION

CROSS REFERENCE TO RELATED APPLICATIONS

This application is a U.S. National Phase application under 35 U.S.C. § 371 of International Application No. PCT/EP2019/074274 (WO 2020/094276 A1), filed on Sep. 11, 2019, and claims benefit to American Patent Application No. U.S. 62/757,769, filed on Nov. 9, 2018.

FIELD

The present invention relates to a method and system for adaptive network intrusion detection.

BACKGROUND

Intrusion detection systems (IDSs) are one of the most important entities when it comes to information and communications technology (ICT) infrastructure protection against cyberattacks. IDSs weaponize defenders with fundamental means to detect offensive events and consequently trigger optimal counteraction plans against them. Because new attacks continue to emerge, the industry needs new methods that are able to adapt rapidly to the changes in the field.

In principle, misuse detection systems are the most widely deployed kind of intrusion detection systems. Misuse IDSs rely on known signatures trying to designate network traffic instances to legitimate or attack traffic classes. This kind of IDS lacks the ability of identifying new attack patterns or deviations from known ones, and their performance depends on the freshness of the signatures database. Hence, the IDS's administrator needs to put significant effort to keep the misuse detection model up to date. Because the protected environment may be a dynamic ecosystem where new devices and/or services may appear or leave the network at any moment (e.g., the Internet of Things (IoT)), adaptability can become a burden for system administration.

Keeping any type of IDS up-to-date is a demanding task for several reasons, for example, due to issues pertaining to environmental changes. Environmental changes refers to any aspect of a network that can change and consequently affect the profile of the generated network traffic. In practice, the addition (or disengagement) of a device in a network can affect different network aspects, including the topology, the running services, the open ports, the communication protocols and/or applications, the network traffic load, and others. In turn, these environmental changes affect fundamental security features, such as the vulnerabilities appearing in the network, which can generate multiple penetration paths for the attackers. Considering a more dynamic network like an IoT environment, an Ad Hoc network, or even a corporate network with a Bring your own device (BYOD) policy applied, one can understand that the attack surface of the network can be increased unexpectedly. It is plausible that, the newly introduced device might be already infected by a malware and act as a stepping stone for an attacker to conquer more assets within the network. Yet, new devices are not the only enemies of an IDS in a network, as also already installed devices will eventually proceed with software/OS updates or new software installations that again will bring in alterations in the environment.

Overall, the above mentioned changes are routine actions that constantly appear in every common network, rather than unusual events. In practice all sorts of modifications can significantly affect the performance of an IDS, which is placed to protect an ever-changing infrastructure. This reality, combined with the lack of adaptable detection engines, forces a legacy IDS to become quickly outdated and inadequate as it inevitably has to operate in new and "unknown" environments for which its engine was not trained to do so. Thus, security administrators undertake the task of constantly retraining the IDS by considering all the new environmental changes to regain the reliability and the performance of the detection system. All in all, the cardinal challenge for any IDS designer, i.e., find proper ways to automatize a retrain process, remains largely unsolved.

The following references provide further background relevant to the present invention, and each of which are hereby incorporated by reference herein in their entirety: R. Raina, A. Battle, H. Lee, B. Packer, A. Y. Ng, "Self-taught learning: Transfer learning from unlabeled data," Proceedings of the 24th International Conference on Machine Learning, ICML '07, 759-766 (2007) ("Raina"); J. O. Kephart, D. M. Chess, "The vision of autonomic computing," Computer 36 (1), 41-50 (2003) ("Kephart"); W. Lee, S. J. Stolfo, "A framework for constructing features and models for intrusion detection systems," ACM Trans. Inf. Syst. Secur. 3 (4), 227-261 (2000) ("Lee"); and M. Tavallaee, E. Bagheri, W. Lu, A. A. Ghorbani, "A detailed analysis of the kdd cup 99 data set," Proceedings of the Second IEEE International Conference on Computational Intelligence for Security and Defense Applications, CISDA'09, 53-58 (2009) ("Tavallaee").

SUMMARY

In an embodiment, the present disclosure provides a method that adapts network intrusion detection. The method includes: a) deploying a network traffic capture system and collecting network packet traces; b) using a network audit tool, extracting features from the collected network packet traces; c) feeding the extracted features as unlabeled data into a representation function, and, utilizing the representation function as an unsupervised feature learning algorithm, learning a new representation of the unlabeled data; d) providing a labeled training set capturing examples of malicious network traffic, and, using the learned new representation of the unlabeled data, modifying the labeled training set to obtain a new training set; and e) using the new training set, training a traffic classification machine learning model.

BRIEF DESCRIPTION OF THE DRAWINGS

Subject matter of the present disclosure will be described in even greater detail below based on the exemplary figures. The invention defined by the following claims is not limited to the exemplary embodiments. All features described and/or illustrated herein can be used alone or combined in different combinations. The features and advantages of various embodiments will become apparent by reading the following detailed description with reference to the attached drawings, which illustrate the following:

DETAILED DESCRIPTION

An embodiment of the present invention provides a method for adaptive network intrusion detection that includes: a) deploying a network traffic capture system and collecting network packet traces; b) using a network audit tool to extract features from the collected network packet traces; c) feeding the extracted features as unlabeled data into a representation function and utilizing the representation function as an unsupervised feature learning algorithm to learn a new representation of the unlabeled data; d) providing a labeled training set capturing examples of malicious network traffic and using the learned new representation of the unlabeled data to modify the labeled training set to obtain a new training set; and e) using the new training set to train a traffic classification machine learning model. Embodiments of the method may further include: f) deploying the traffic classification machine learning model for examining live traffic. Before feeding the live traffic to the traffic classification machine learning model the live traffic's extracted features may be in embodiments of the method modified using the representation function. In embodiments, operations c)-e) can be repeated periodically to adapt to network traffic changes.

Furthermore, an embodiment of the present invention provides a system for adaptive network intrusion detection, wherein the system comprises a network traffic capture system configured to collect network packet traces; a network audit tool configured to extract features from the collected network packet traces; a representation function configured to receive from the network audit tool the extracted features as unlabeled data, to execute an unsupervised feature learning algorithm to learn a new representation of the unlabeled data, to receive a labeled training set capturing examples of malicious network traffic, and to use the learned new representation of the unlabeled data to modify the labeled training set to obtain a new training set; and a traffic classification machine leaning model configured to be trained using the modified training set.

The present invention provides a technique to improve the detection accuracy of Network Intrusion Detection Systems when network conditions and attacks change, by employing periodic learning of feature maps via autoencoders. For example, an embodiment provides a method and a system for self-adaptive and autonomous IDSs that addresses the above-mentioned inherent limitations of state of the art intrusion detection systems.

Additionally, embodiments of the present invention address the following problems: legacy misuse IDSs lack the ability of identifying new attack patterns or deviations from known ones; legacy misuse IDSs become quickly outdated and inadequate as they inevitably have to operate in new and unknown environments, whose engine was not trained to do so; keeping a legacy misuse IDS up-to-date is a demanding engineering task as security administrators need to manually investigate for new and unknown offensive network incidents, label them, and then retrain the detection engine; the dynamic nature of the state-of-the art networks brings in network environmental changes that render the legacy IDSs ineffective; and proper methods to automatize the retraining process of a misuse IDS remain unsolved.

In the context of the present invention, numerous types of events that lead the network into a new state, and thus affect the IDS's operational environment are perceived. Such changes also affect the network's behavioral profile, which in turn is reflected in the network flows. According to RFC 2722, a network flow can be seen as an artificial logical equivalent to a call or connection, which has as attribute values aggregated quantities which reflect the events that take place during this connection. These attribute values can bear valuable information regarding numerous aspects of the network's behavior ranging from the topology to the workload and the active services. Thus, network flows are a rich source of information that can improve the network security visibility as they can be leveraged by security analysts to identify and assess hostile actions, new attacks, and the network's security state in general. As a result, when a network is overwhelmed by unknown and previously unseen network flows, an IDS, which has been trained to defend a network based on a static training set needs to be retrained in order to sustain a credible security level. This however implies the need of a demanding process on behalf of the security analyst to identify and label manually new network instances for creating a new dataset that can be used to retrain the IDS. Considering that most of the network changes are common actions that can happen regularly, it becomes clear that there is a need for methods capable of automating the retraining process.

To this end, embodiments of the present invention aim to offer an automated way to keep the detection ratio of a misuse IDS to acceptable levels regardless of the environmental changes that may indicate the presence of previously unknown attacks. Embodiments of the invention can empower autonomous and self-adaptive misuse IDSs by enabling them to adapt to their environment and significantly contribute in keeping a high or at least acceptable security level. This quality also significantly alleviates security experts from the demanding task of retraining the IDS. Unlike the current state-of-the-art IDSs, which do not use self-adaptive and autonomous methods to automatize the retraining process of a misused IDS, embodiments of the present invention overcome limitations of the state-of-the-art IDSs and provide methods for automatically adapting IDSs without the constant need to manually refresh a training set and retrain.

An embodiment of the present invention provides a method for adaptive network intrusion detection that includes learning of feature mapping function's parameters from unlabeled network traffic samples and usage of such parameters to transform the feature of a labeled data set's samples, which are then used to autonomously re-train an intrusion detection classifier.

An embodiment of the present invention provides a method for adaptive network intrusion detection that includes the following operations:
1) Deploy a network traffic capture system and collect network packet traces;
2) Use a network audit tool for extracting features from the collected packet traces;
3) Use the extracted features to train a representation function using machine learning (e.g., by using an autoencoder);
4) Use the trained representation function to modify a labeled training set that captures examples of malicious network traffic;
5) Use the modified training set to train a machine learning algorithm for traffic classification (traffic classification model);

6) Deploy the traffic classification model for examining live traffic. Before feeding the live traffic to the model, the live traffic's extracted features may be modified using the same the learned representation function used to modify the training set; and/or 7) Repeat the points 3-7 periodically to adapt to network traffic changes.

Embodiments of the present invention are able to exploit unlabeled data $U=\{x_u^{(1)}, x_u^{(2)}, \ldots, x_u^{(k)}\}$, which can: 1) be of any class and not necessarily to coincide with the classes of the labeled data T, and 2) be drawn from a different distribution from the labeled data T. In an unknown network environment, an IDS will face both known and unknown attacks, which both stem from different distributions. Thus, embodiments of the present invention are able to uncover new attack patterns or deviations from known ones.

Embodiments of the present invention alleviate the burden of retraining an IDS every time a change appears in its environment. This can eliminate burdens for the administrator, because the retraining process can require significant effort to assign labels by hand to large-scale data such as network data. Embodiments of the present invention significantly extend the autonomy of an IDS. For example, embodiments enable minimizing's significantly the engagement of the security administrator in the maintenance of the IDS as it is a self-adaptive and autonomous approach.

Embodiments of the present invention, unlike the state-of-the-art, keep the attack detection ratio to high levels in situations where normally the security administrators would be forced to manually retrain and reset the IDS. In fact, by implementing the present invention the need for human intervention may not be eliminated completely, that is, the administrator should initialize the system and configure its parameters accordingly.

An embodiment of the present invention uses principles described by the MAPE-K reference model (see, e.g., Kephart) to build autonomous and self-adaptive systems, while it utilizes Self-taught learning (STL) (see, e.g., Raina) for grasping network traffic dynamics based on generalized features reconstructions stemming directly from the unknown network environment and its unlabeled data. Embodiments enable self-adaptation and autonomic computing in an IDS system by taking advantage of transfer learning from unlabeled data via a systemic method.

Self-Taught Learning (STL) is a machine learning framework that is able to exploit unlabeled data with the purpose of improving a supervised classification problem. In the STL concept, both labeled and unlabeled data are provided.

The labeled data are used as the initial training set of m samples for a given classification task $T=\{(x_l^{(1)}, y^{(1)}), (x_l^{(2)}, y^{(2)}), \ldots, (x_l^{(m)}, y^{(m)})\}$, where $x_l^{(i)} \in \mathbb{R}^n$ is the i-th sample with n features, $y^{(i)} \in \{1, \ldots, C\}$ is the class label, and the l symbol stands for "labeled".

The set of k unlabeled samples $U=\{x_u^{(1)}, x_u^{(2)}, \ldots, x^{(k)}\}$, where $x_u^{(i)} \in \mathbb{R}^n$ is the i-th unlabeled sample with n features, and u stands for "unlabeled". U is given as input to an unsupervised learning method to learn a higher level structure of those data. This structure is then used as a base to transform the initial labeled dataset T and obtain a new training set $\hat{T}=\{(a_l^{(1)}, y^{(1)}), (a_l^{(2)}, y^{(2)}), \ldots, (a_l^{(m)}, y^{(m)})\}$, where $a_l^{(i)} \in \mathbb{R}^v$ represents the i-th new training example. In consequence, the new training dataset $\hat{T}$ can be used to train a supervised learning method.

Embodiments of the present invention take advantage of the beneficial characteristics of STL to provide a broader and holistic system for self-adaptive and automatic misuse IDSs. More specifically, the latter is trained based on an initial basic labelled training set T. However, due to the environmental network changes, the IDS inevitably will face performance issues. That is, by exploiting the unknown and unlabeled traffic U of the network, an embodiment of the present invention, through the cooperative operation of its diverse subsystems, is able to revitalize autonomously the initial dataset T and generate a new training set T, which can be used to "on-the-fly" retrain the IDS engine and sustain its detection ability to high levels.

Figure 1:
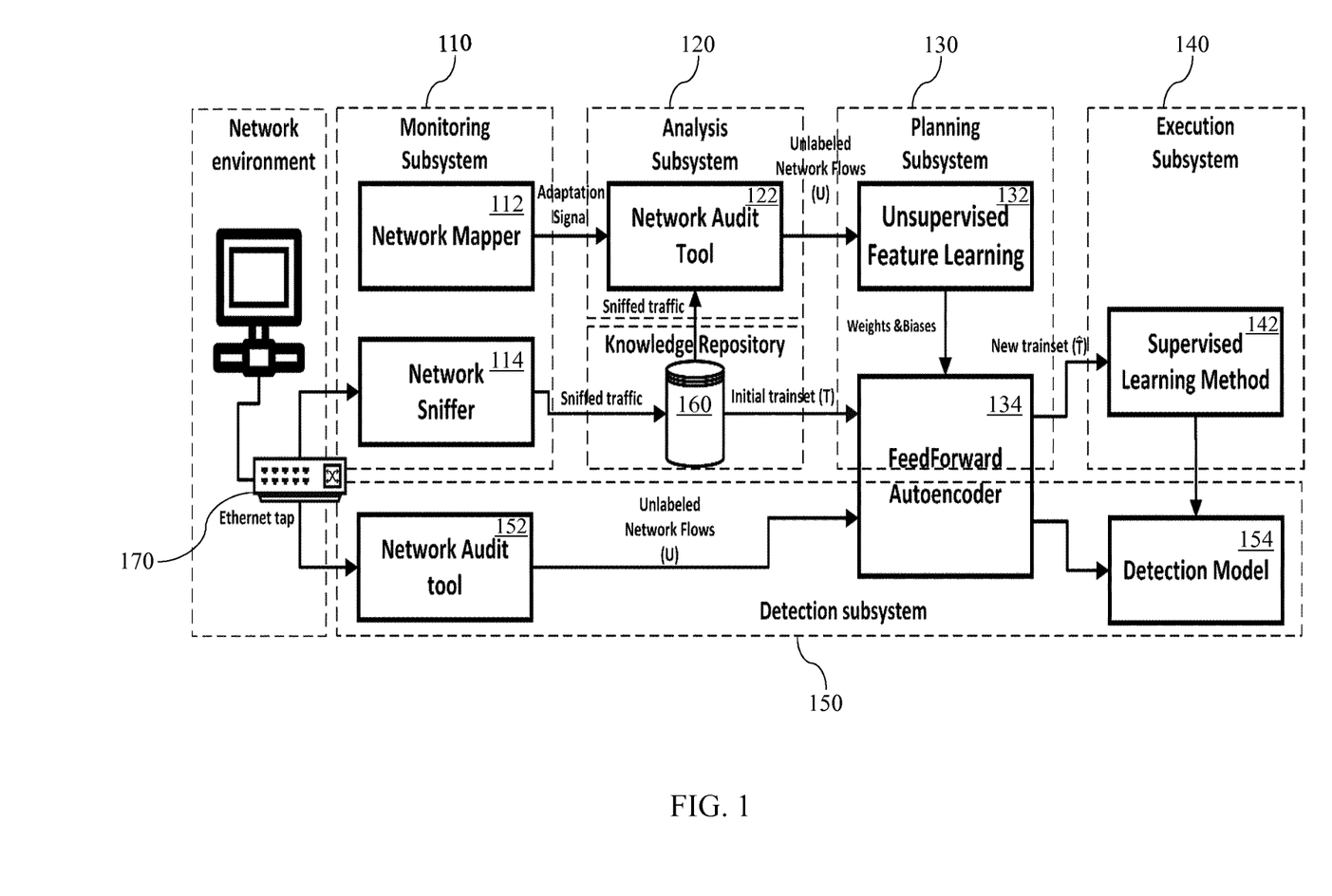
FIG. 1 shows an overview of a system for adaptive network intrusion detection in accordance with an embodiment of the present invention.

FIG. 1 illustrates a system according to an embodiment, which, in turn, is made up of five subsystems following the principles of a MAPE-K method, while the interconnections among the subsystems are annotated with the exchanged information. According to embodiments of the invention, the benefits of MAPE-K and STL co-work toward coping with the challenges of building a solid basis for misuse adaptive IDSs. Generally, MAPE-K is a reference model to build autonomous and self-adaptive systems, wherein the model comprises five activities that operate over a Domain Specific System (DSS) and a Context. In case of embodiments of the present invention, the DSS is the IDS per se, while the Context can be adjusted to any given type of network where there is a need of an adaptive IDS. The cardinal operation of capturing any new characteristics of unknown traffic and the autonomous generation of the new training set is undertaken by the planning subsystem. The latter enables adaptive intrusion detection.

Monitoring subsystem: According to embodiments of the invention, the monitoring subsystem 110 is configured as a network traffic capture system that collects network packet traces. Specifically, the monitoring subsystem 110 undertakes the task of coordinating the sensors for acquiring the basic knowledge that will reveal the need of IDS adaptation. Network mappers 112 can be used as the basic sensors for network inventory. Such entities are able to determine various characteristics of the network including its topology, the available hosts, the running services, open ports, the operating systems, and even potential vulnerabilities. By collecting such information, the Monitoring subsystem 110 is able to determine any alteration event that requires an IDS adaptation. The monitoring activity is able to determine the environmental changes in collaboration with the Knowledge activity, which serves as a repository 160 for reference purposes. The Monitoring subsystem 110 can schedule the network mapping process to occur periodically according to the characteristics of the network.

In parallel, another sensor type, which is controlled by the Monitoring subsystem 110, is the Network Sniffers 114. The latter are used to capture the network traffic through the Ethernet tap 170. The captured traffic is stored in the Knowledge repository 160. This traffic is used as the basis to extract in a later stage the network flows which have to pass through the detection engine/model 154 of the IDS. Additionally, the network traffic is stored in the repository 160 to serve the purpose of adaptation as it is described further down in the Planning/Execution subsystems 130/140.

Analysis subsystem: According to embodiments of the invention, the analysis subsystem 120 comprises network audit tools 122 to extract features from network packet traces connected by the network traffic capture system, e.g. the monitoring subsystem 110. Specifically, after collecting the necessary data, the Analysis subsystem 120 performs the transformation of the raw network traffic into network flows. By using the stored traffic of the repository component 160, the Analysis subsystem 120 utilizes network audit tools 122 such as Argus (cf Argus. The Network Audit Record Generation and Utilization System. Accessed: Jan. 23, 2019. [Online]. Available: https://qosient.com/argus/index.shtml) or CICFlowMeter (cf. CICFlowMeter. UNB CIC Network Traffic Flow Generator (Formerly SCXflowmeter). Accessed: Jan. 23, 2019. [Online]. Available: http://www.unb.ca/cic/datasets/flowmeter.html) in order to generate the network flows. These tools are able to analyze large amounts of network traffic even in an in-line manner and process them accordingly to generate highly informative network flows with various features. These features include the machine learning features of the network traffic instances which are fed into the IDS engine 154 for detection purposes. These flows constitute the unlabeled dataset U, which are given into the supervised model of the IDS to detect potential attacks, and are used as the unlabeled data fed to the Planning subsystem 130 to fuel the adaptive process. Consequently, according to embodiments of the invention, during the IDS operation, the adaptive process may be simultaneously executed with the aim of coming up with a new detection model 154 that will replace the existing one.

Planning subsystem: The Planning subsystem 130 undertakes the process of leveraging the unlabeled data for initiating the adaptive process. Until that point, the Monitoring subsystem 110 and the Analysis subsystem 120 identified environmental changes in the network, the Knowledge repository 160 consolidated the network flows, which were generated by the time that the change(s) occurred. This moment is the beginning of a time interval when the IDS may face unknown network instances that can undermine its performance. In this direction, the Planning subsystem 130 is configured to cope with this ambiguity by utilizing unsupervised feature learning methods. An embodiment of the present invention utilizes, for example, Sparse Autoencoders as the unsupervised learning method 132 to learn informative and sparse new representations ($\hat{T}=\{(a_I^{(1)}, y^{(1)}), (a_I^{(2)}, y^{(2)}), \ldots, (a_I^{(m)}, y^{(m)})\}$) of the unlabeled data ($U=\{x_u^{(1)}, x_u^{(2)}, \ldots, x_u^{(k)}\}$) and thus benefit the supervised task of the misuse IDS.

Unsupervised feature learning through Sparse Autoencoders:

An autoencoder is a neural network that applies backpropagation and aims to reconstruct a given input to an output that approximately resembles to the initial input. That is, the neural network, given an input x, attempts to learn a function $h_{W,b}(x) \approx x$, where W, b vectors denote the weights and biases among the layers and their units of the neural network. This process can be driven also by other objectives apart from minimizing solely the reconstruction error. Embodiments of the present invention utilize a sparse autoencoder in order to learn sparse representations of the input data. For example, an embodiment utilizes a sparse autoencoder of three layers ($n_I=3$). The backpropagation process can be driven by the following cost function (Equation 1):

$$J(W, b) = \frac{1}{k}\sum_{i=1}^{k}\left(\frac{1}{2}\|x^{(i)} - \hat{x}^{(i)}\|_2^2\right) + \frac{\lambda}{2}\sum_{l=1}^{2}\sum_{i=1}^{s_l}\sum_{j=1}^{s_{l+1}}\left(W_{ji}^{(l)}\right)^2 + \beta\sum_{j=1}^{s_2} KL(\rho\|\hat{\rho}) \quad (1)$$

where:
$x^{(i)} \in \mathbb{R}^n$ is the i-th input of an unlabeled example;
$\hat{x}^{(i)} \in \mathbb{R}^n$ is the i-th output given the i-th input;
k is the number of the examples in the unlabeled training set;
$\lambda$ is the weight decay parameter;

l index denotes the number of a layer;
$s_l$ is the number of nodes in the l layer;
$\beta$ is the weight of the sparsity penalty; and
$\|x^{(i)} - \hat{x}^{(i)}\|_2^2$ is the squared $L^2$ norm.

Through backpropagation, the sparse autoencoder aims to minimize the cost function (1). As can be seen, the cost function includes three terms. The first term represents the average accumulated squared error among the input and the output terms of the network. Thus, by using the first term the network tries to reconstruct the output and achieve high similarity with the input. The output terms derive as follows: $\hat{x}^{(i)} = h_{W,b}(x^{(i)}) = f(\Sigma_{j=1}^{s_2} W_{ij}^{(2)} a_j^{(2)} + b_i^{(2)})$ where $a_j^{(2)}$ are the activations of the hidden units ($2^{nd}$ layer) and the sigmoid function $$f(z) = \frac{1}{1 + \exp(-z)}$$

has been chosen as the activation function for the neurons. This activation function gives values between 0 and 1, while it regulates the weights of the network to change gradually and output better results. Additionally, the sigmoid function introduces non-linearity into the model, thus aiding in capturing non-linear combinations of the input data. The second term refers to the weight decay term that tries to decrease the magnitude of the weights ($W_{ji}^{(l)}$) among the nodes of the layers, while $\lambda$ controls the importance of the weight decay term. The last term is a function that applies the sparsity penalty, where $$KL(\rho\|\hat{\rho}_j) = \rho \log\frac{\rho}{\hat{\rho}_j} + (1-\rho)\log\frac{(1-\rho)}{(1-\hat{\rho}_j)}$$

is the Kullback-Leibler (KL) divergence that can determine the difference between two distributions having $\rho$ and $\hat{\rho}_j$ mean values respectively. That is, p defines a desired level of sparsity, while $\hat{\rho}_j$ is the average activation of the j-th hidden unit. The magnitude of the sparsity penalty is regulated by the $\beta$ weight.

Input reconstruction through Feedforward Autoencoder 134.

The training process of a sparse autoencoder defines weight and bias vectors (W, b)=($W^{(1)}$, $b^{(1)}$, $W^{(2)}$, $b^{(2)}$), in an embodiment utilizing an encoder with three layers. Next, these vectors can be used in a feedforward manner over a new input for finding a new and more informative structure of this input. In other words, the knowledge acquired from the unlabeled data U that fed into the sparse autoencoder can now be exploited for restructuring another dataset. This reconstruction is driven by a new representation which is learned out from unlabeled data, i.e., data that stem from an unknown environment.

Following this principle, a system according to the present invention can generate a new representation of the basic labeled dataset ($T=\{(x_I^{(1)}, y^{(1)}), (x_I^{(2)}, y^{(2)}), \ldots, (x_I^{(m)}, y_I^{(m)})\}$), which was initially used to train the IDS. This is done toward producing a new labeled training set i that has as features the activations of the hidden units. That is, given T as the new input in a feedforward autoencoder 134, the system can calculate the new activation vectors using the weights and biases of the first layer $W^{(1)}$, $b^{(1)}$ by applying the activation function. As a result, the system produces a new dataset $\hat{T}=\{(a_I^{(1)}, y^{(1)}), (a_I^{(2)}, y^{(2)}), \ldots, (a_I^{(m)}, y^{(m)})\}$, where $a_I^{(i)}$ represents the i-th new training example. Thus, each $a_I^{(i)}$ example is a vector set of $s_2$ activations, $$a_I^{(i)} = \{a_{l_1}^{(i)}, a_{l_2}^{(i)}, \ldots, a_{l_{s_2}}^{(i)}\},$$

and each activation is given as follows (Equation 2):

$$a_{l_p}^{(i)} = f\left(\sum_{j=1}^{s_1} W_{pj}^{(1)} x_{l_j}^{(1)} + b_p^{(1)}\right),$$

where $p=\{1, \ldots, s_2\}$ (2)

Finally, the new training dataset $\hat{T}$ can be used to train a supervised learning method 142.

The feedforward autoencoder 134 method adds an extra layer of data transformation. That is, any instance which will be subjected into the final detection model 154 for detection purposes, passes first through the feedforward autoencoder 134 to acquire the same transformation properties. This is why the feedforward autoencoder 134 component in the embodiment of FIG. 1 is extended also into the detection subsystem 150.

All in all, the planning subsystem 130 takes as inputs the T and U and produces $\hat{T}$. Embodiments use the benefits of STL to provide an improved method enabling self-adaptation in the context of intrusion detection systems.

Execution subsystem: The outcome of the Planning subsystem 130 is a feedforward autoencoder 134 which is used for reconstructing the initial labeled dataset T and acquire $\hat{T}$. Hence, the Execution subsystem 140 undertakes the training of a supervised learning method 142 based on the new dataset $\hat{T}$. This step does not impose any constrains regarding the supervised learning method 142 that can be used to empower the detection system 154. An embodiment of the present invention makes use of Support Vector Machine (SVM) to deliver a multi-classification detection model. After training the new model, the old one, which due to the environmental changes had started facing efficiency problems, can now be replaced.

Knowledge repository: During the adaptive system loop, the Knowledge repository 160 component is accountable for storing purposes. The Knowledge repository 160 supports the adaptive operations and helps exchanging the inputs and outputs of each subsystem among them. More specifically, the repository 160 stores the sniffed network traffic as the result of the Monitoring subsystem 110. Upon the adaptation signal of the network mapper 112, these captures will become the input of the network audit tool 122 for generating the network flows. Additionally, the repository 160 holds the initial labeled dataset T, which is used as a basis every time the system performs an adaptation loop.

Detection subsystem: The detection subsystem 150 undertakes the detection of offensive incidents occurring to the protected network. To do so, the unlabeled network traffic (U) passes through the Ethernet tap 170 and gets subjected to the same transformation applied to the training set T used to generate the detection model 154. That is, the network traffic gets translated by the Network audit tool 152 into machine learning-ready instances, and then is passed through the feedforward autoencoder 134 in order to acquire the same representation of the new training set $\hat{T}$. In this way, the unknown traffic passes through the detection model 154 for detecting potential offensive incidents.

In order to evaluate the performance of the present invention, an example embodiment was subjected to 100 consecutive network environmental changes and its performance was compared against a statically trained IDS.

The evaluation of the example embodiment was based on the KDDCup'99 (see, e.g., Lee) and NSL-KDD (see, e.g., Tavallaee) datasets. The aforementioned datasets were merged to create a single voluminous dataset that bears as many network traffic instances and as many attack classes as possible. Table 1 presents the instances of the used dataset. In total, the compiled dataset has approximately 1.3 million network instances and includes 40 classes (1 normal+39 attacks), which come under different probability distributions and fall into the following 5 major categories Normal, DoS (denial of service), PRB (probing), R2L (remote to local) and U2R (user to root).

TABLE 1

Normal and Attack Classes in KDDCup'99 and NSL KDD

| Class | KDDCup'99 and NSL-KDD subclasses and the number of instances | #Instances |
| --- | --- | --- |
| Normal | Normal traffic is not divided into sub-classes | 936,152 |
| DoS | back (2,633), neptune (297,085), smurf (6,688), teardrop (1,828), land (46), pod (448), apache2 (1,531), mailbomb (601), processtable (1,429), udpstorm (4) | 312,293 |
| PRB | satan (10,226), portsweep (6,787), ipsweep (7,411), nmap (3,200), mscan (2,044), saint (683) | 30,351 |
| R2L | ftp_write (22), warezclient (1,783), spy (4), named (34), warezmaster (1,986), multihop (50), xsnoop (8), sendmail (29), snmpguess (690), imap (25), snmpgetattack (357), worm (4), xlock (18), phf (12), guess_passwd (2,639) | 7,661 |
| U2R | buffer_overflow (102), httptunnel (278), loadmodule (22), perl (10), rootkit (46), xterm (26), ps (31), sqlattack (4) | 519 |
| Total | 40 classes | 1,286,976 |

All duplicates were removed from the merged dataset to avoid any bias to the classification end-model. Hence, the compiled dataset consists of 1.3 million instances without duplicates. The KDDCup dataset created over a network experiment that lasted for 9 weeks and the final result was a dataset of approximately 7 million network instances with duplicates. The compiled dataset consists of 1.3 million instances without duplicates. This implies that the dataset corresponds to a data collection period of at least 12 days. Hence, the compiled dataset comprises a realistic collection of network traffic that spans adequately over time and it is thus suitable for evaluating an adaptive mechanism.

Additionally, the example embodiment was evaluated using the following metrics:

$$\text{Accuracy } (Acc) = \frac{\sum_{i=1}^{C} TP_i}{N}$$

$$\text{Mean } F-\text{Measure } (MFM) = \frac{\sum_{i=1}^{C} FMeasure_i}{C}$$

$$FMeasure_i = \frac{2 \cdot Recall_i \cdot Precision_i}{Recall_i + Precision_i}$$

$$Precision_i = \frac{TP_i}{TP_i + FP_i}$$

$$\text{Recall}_i = \frac{TP_i}{TP_i + FN_i}$$

$$\text{Average Accuracy } (AcgAcc) = \frac{1}{C}\sum_{i=1}^{C} \text{Recall}_i$$

$$\text{Attack Accuracy } (AttAcc) = \frac{1}{C-1}\sum_{i=2}^{C} \text{Recall}_i$$

$$\text{Attack Detention Ratio } (ADR) = \frac{\sum_{i=2}^{C} TP_i}{\sum_{i=2}^{C} TP_i + FP_i}$$

$$\text{False Alarm Rate } (FAR) = \frac{FN_1}{TP_1 + FN_1}$$

Where:

$TP_i$, $FP_i$, $TN_i$, $FN_i$ are the True positives, False Negatives, True Negatives and False Negatives of the i-th class, respectively;

C is the number of classes of the dataset; and

Index i=1 stands for the normal traffic class.

The example embodiment was exposed to an ever-changing environment to illustrates its ability to adapt. In the evaluation the self-adaptive and autonomous example embodiment of the present invention was compared against a statically trained IDS. Both IDSs were initially trained with the same representative dataset T, which included a fraction of 10% of normal traffic and a randomly chosen subset of attack traffic. This attack-focused subset consists of 3, 3, 3 and 4 attacks subclasses of the major classes DoS, PRB, U2R, and R2L respectively.

Consequently, both IDSs were imposed to 100 network environment changes. Each environment is a randomly selected piece of the dataset which consists of 10% of normal traffic and 5, 5, 5, 8 attacks subclasses of the major classes DoS, PRB, U2R and R2L, respectively. In fact, these dataset pieces constitute the unlabeled and unknown dataset U. U might or might not contain the classes or the instances gathered in T. Additionally, apart from the diversity of the classes, these random dataset pieces have high diversity in their features. This means that, among others, features such as the protocols, services, and incoming/outbound traffic patterns constantly change. Hence, depending on the divergence between T and U the new environment can be either slightly or very different from the initial one. That is, it is expected to witness a low or even high drop of the IDS efficiency respectively.

Figure 2:
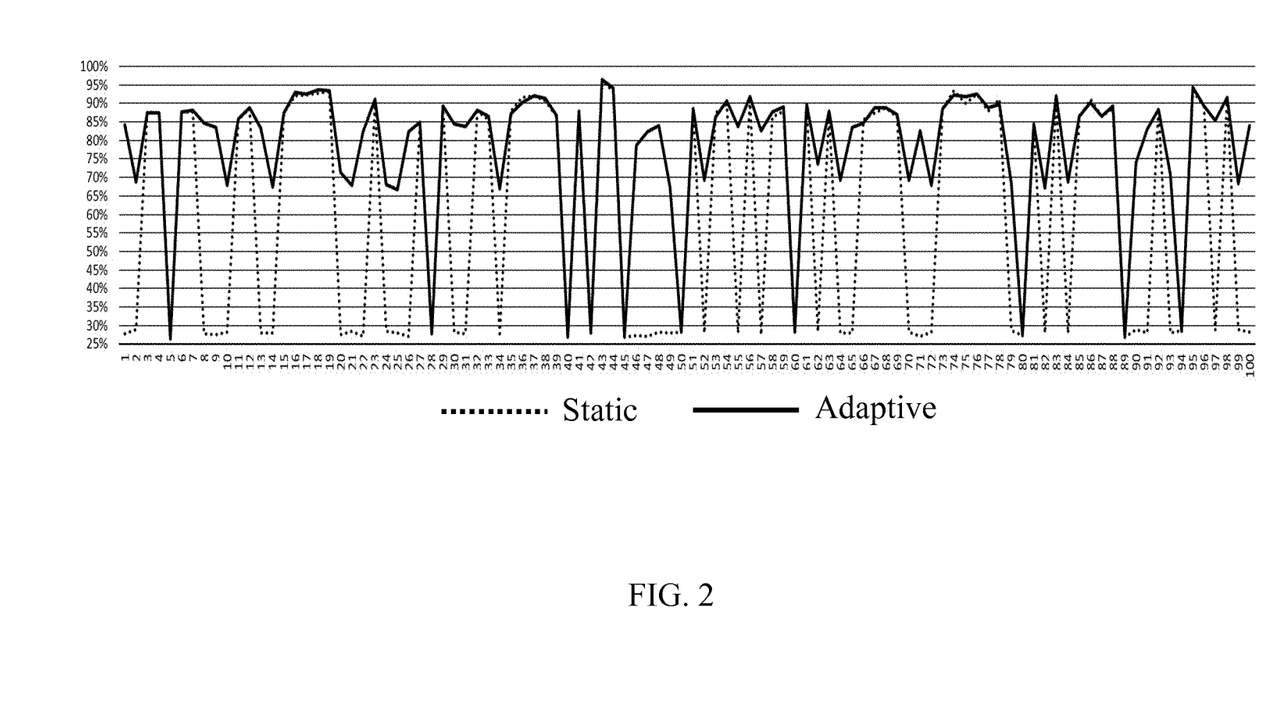
FIG. 2 illustrates deviation of IDS accuracy over 100 consecutive environmental states.

As can be seen in FIG. 2, the self-adaptive and autonomous example embodiment of the present invention surpasses the static IDSs in most of the environmental states. More specifically, in 84% of the states the adaptive method of the example embodiment achieved a higher accuracy score compared to the static method of the comparison IDS. The average accuracy of the static method was 59.71%, while the average accuracy of the example embodiment's adaptive method was 77.99%. This means that in average the example embodiment performs better by 18.28% over the 100 unknown states. Additionally, the standard deviation is 30.79% and 18.78% for the static and the adaptive methods respectively. This fact quantifies what intuitively can be observed from FIG. 2, where the adaptive curve witnesses less and smaller efficiency drops over the vast majority of the states. The maximum positive accuracy difference between the two methods is 56.92% (state #8), while the maximum negative difference is −1.6% (state #36). In fact, as can be seen in FIG. 2, in critical cases where the IDS accuracy drops significantly due to a state's high deviation with respect to the initial training set (T), the adaptive methodology demonstrates a significantly higher contribution that can sustain the IDS to acceptable detection levels. All in all, the adaptive approach of the present invention greatly outperforms the static approach. especially when it comes to critical states.

Figure 3:
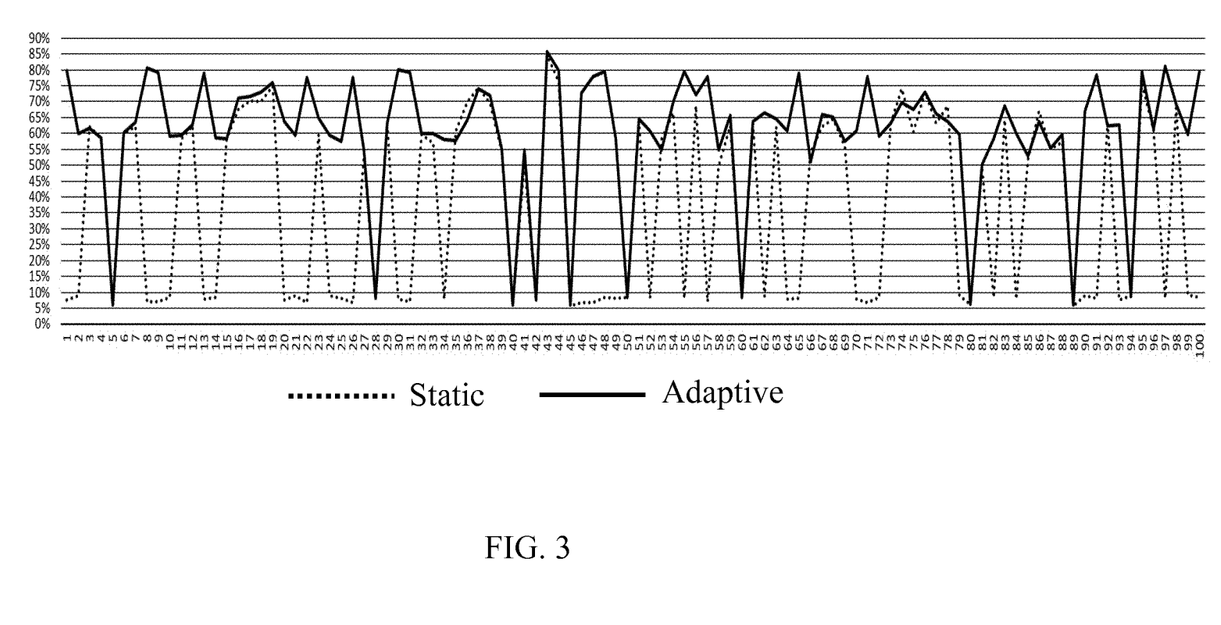
FIG. 3 illustrates deviation of IDS attack detection ratio over 100 consecutive environmental states.

FIG. 3 presents the ADR performance over the 100 environmental states. The ADR measures the accuracy in detecting exclusively attacks instances, and thus reveals the performance in offensive incident detection. Overall, the adaptive method of the example embodiment scores an average ADR of 60.34% and outweighs the comparison static method by 23.8%, as the latter scores an average ADR of 36.54%. The standard deviations are 28.34% and 19.69% for the static and the adaptive method respectively. In total, the adaptive approach of the present invention is proved better for the 86% of the states and, notably, the maximum ADR increment is 73.37% (state #8), while the maximum deficient percentage is −5.67% (state #36). As in the case of the accuracy metric, ADR achieves high scores for those states where the static approach witnesses significant performance drops.

Figure 4:
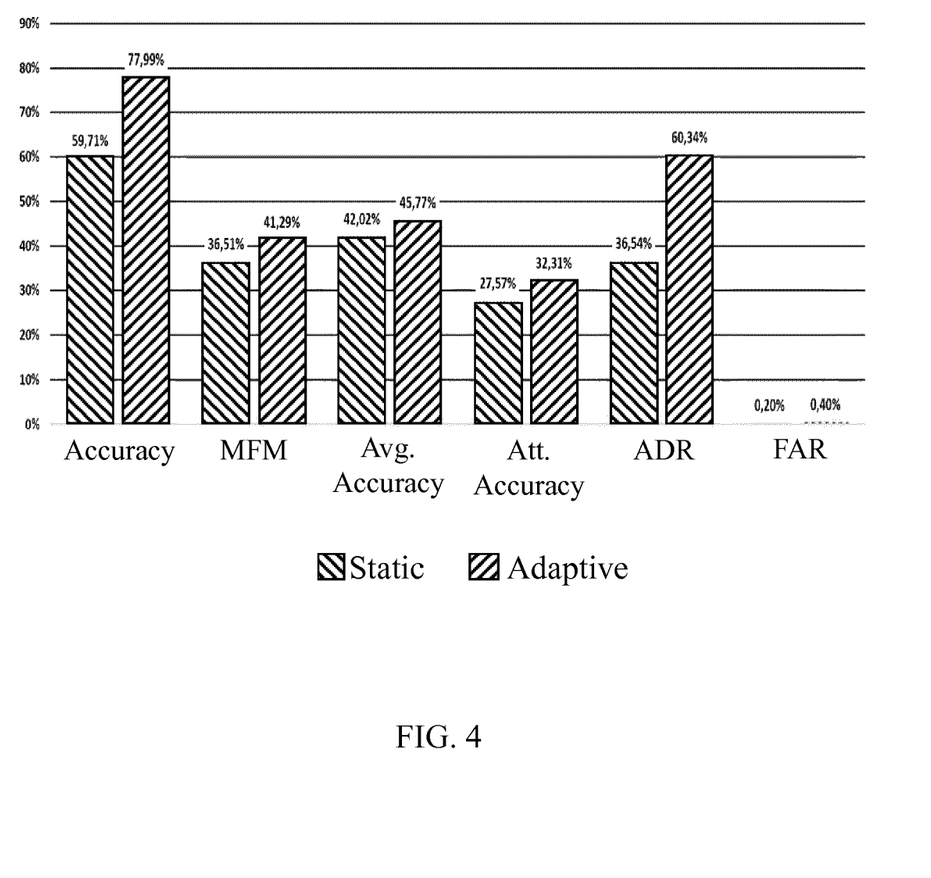
FIG. 4 illustrates a performance comparison over all the average metrics.

The overall performance of the adaptive method of the example embodiment and the comparison static method is illustrated in FIG. 4. The dominance of the adaptive method is verified by all the metrics. Apart from the accuracy and the ADR metrics analyzed above in detail, also the rest of metrics prove the superiority of embodiments of the present invention. The difference of 4.78% in the MFM metric reveals that the adaptive method is able to keep the balance between Recall and Precision among all the dataset classes to a greater extent. Note that the MFM metric, as defined above, is the unweighted average of recall and precision. That is, the unweighted MFM constitutes a stricter metric to evaluate the methods, as it treats all classes equally independently of the classes' size. This means that the adaptive method of the present invention is not only able to provide better attack detection rates, but it is also capable of identifying with higher precision the correct class where the attack instances belong to. Finally, the small deficiency (0.2%) in the FAR metric can be characterized as negligible.

One value of embodiments of the present invention lies in the fact that embodiments can breathe new life into the IDS in critical/sudden situations and increase ADR by up to 73.37%. In principle, in critical situations where the IDS performance drops significantly there is an urgent need for human intervention. Namely, in these cases, ADR can drop to such deficient levels that most of the attacks occurring in the network can go completely unnoticed. Hence, instead of triggering a process of manually retraining the IDS, our method empowers a self-adaptive and autonomous system to keep the IDS's operational ability to high levels.

Figure 5:
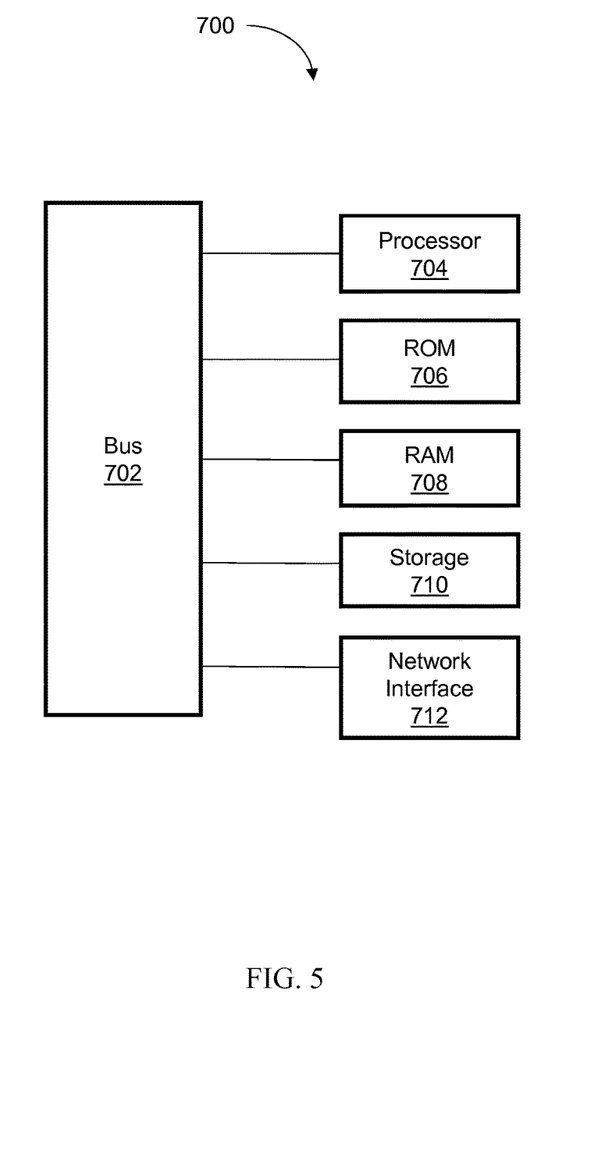
FIG. 5 illustrates a processing system for implementing an embodiment of the present invention.

FIG. 5 is a block diagram of a processing system according to an embodiment. The processing system 700 can be used to implement the protocols, devices, mechanism, systems and methods described above. The processing system 700 includes a processor 704, such as a central processing unit (CPU) of a computing device or a distributed processor system. The processor 704 executes processor executable instructions comprising embodiments of the system for performing the functions and methods described above. In embodiments, the processor executable instructions are locally stored or remotely stored and accessed from a non-transitory computer readable medium, such as storage 710, which may be a hard drive, cloud storage, flash drive, etc. Read Only Memory (ROM) 706 includes processor executable instructions for initializing the processor 704, while the random-access memory (RAM) 708 is the main memory for loading and processing instructions executed by the processor 704. The network interface 712 may connect to a wired network or cellular network and to a local area network or wide area network, such as the Internet.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for adaptive network intrusion detection, the method comprising:
   a) deploying a network traffic capture system and collecting network packet traces;
   b) using a network audit tool, extracting features from the collected network packet traces;
   c) feeding the extracted features as unlabeled data into a representation function, and, utilizing the representation function as an unsupervised feature learning algorithm, learning a new representation of the unlabeled data;
   d) providing a labeled training set capturing examples of malicious network traffic, and, using the learned new representation of the unlabeled data, modifying the labeled training set to obtain a new training set; and
   e) using the new training set, training a traffic classification machine learning model.

2. The method according to claim 1, wherein the representation function is an autoencoder neural network.

3. The method according to claim 1, wherein the method further comprises:
   using live traffic for the traffic classification machine learning model and deploying the traffic classification machine learning model for examining the live traffic.

4. The method according to claim 3, wherein before using the live traffic for the traffic classification machine learning model, extracting features from the live traffic and modifying the live traffic's extracted features using the new representation of the unlabeled data learned in operation c).

5. The method according to claim 1, wherein operations c)-e) are repeated to adapt to network traffic changes.

6. The method according to claim 1, further comprising:
   collecting, by network mappers of a monitoring subsystem, information about network characteristics, comprising a network topology, available hosts, running services, open ports, operating systems, or potential vulnerabilities.

7. The method according to claim 6, further comprising, by the monitoring subsystem:
   determining, based on the collected information, a need for adaptation, and issuing an adaptation signal towards the network audit tool for triggering execution of operations c)-e).

8. The method according to claim 1, wherein the traffic classification machine learning model is based on a supervised learning method that uses of a support vector machine to deliver a multi-classification detection model.

9. A system for adaptive network intrusion detection, the system comprising:
   one or more hardware processors which, alone or in combination, are configured to:
   extract features from network packet traces;
   receive, from the network audit tool, the extracted features as unlabeled data, execute an unsupervised feature learning algorithm to learn a new representation of the unlabeled data, receive a labeled training set capturing examples of malicious network traffic, and use the learned new representation of the unlabeled data to modify the labeled training set to obtain a new training set; and
   train a traffic classification model using the new training set.

10. The system of claim 9, further comprising:
    a planning subsystem that is configured to deploy the traffic classification machine learning model to examine live traffic on the network.

11. The system according to claim 10, wherein the planning subsystem is further configured to extract features from the live traffic and to modify the live traffic's extracted features using the new representation of the unlabeled data learned by the execution of the unsupervised feature learning algorithm, before using the live traffic for the traffic classification machine learning model.

12. The system according to claim 9, further comprising:
    a monitoring subsystem comprising one or more network mappers, the network mappers being configured to collect information about network characteristics, comprising a network topology, available hosts, running services, open ports, operating systems, or potential vulnerabilities.

13. The system according to claim 12, wherein the monitoring subsystem is further configured:
    to determine, based on the collected information, a need for adaptation, and
    to issue an adaptation signal towards the network audit tool for triggering activation of the representation function, the representation function preferably being an autoencoder neural network.

14. The system according to claim 9, further comprising:
    a repository that is configured to store collected network traffic and to hold the labeled training set.

15. The system according to claim 9, further comprising a detection subsystem comprising:

a network audit tool that is configured to receive network traffic and to translate received network traffic into machine learning-ready instances, and a feedforward autoencoder that is configured to receive the machine learning-ready instances from the network audit tool, and to acquire the same representation of the instances as the new training set, before the network traffic passes through a detection model.

16. The system according to claim 9, further comprising a network traffic capture system configured to collect the network packet traces.

17. The system according to claim 9, wherein the new training set is a labeled training set that is a new representation of the labeled training dataset.

18. The method according to claim 1, wherein the new training set is a labeled training set that is a new representation of the labeled training dataset.

* * * * *